(12) United States Patent  
Marsh

(10) Patent No.: US 11,652,686 B2
(45) Date of Patent: May 16, 2023

(54) SYSTEMS AND METHODS FOR DYNAMICALLY COMMISSIONING AND DECOMMISSIONING COMPUTER COMPONENTS

(71) Applicant: MASTERCARD INTERNATIONAL INCORPORATED, Purchase, NY (US)

(72) Inventor: Brian Marsh, Chesterfield, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/820,480

(22) Filed: Mar. 16, 2020

(65) Prior Publication Data

US 2020/0220777 A1 Jul. 9, 2020

Related U.S. Application Data

(63) Continuation of application No. 15/397,839, filed on Jan. 4, 2017, now Pat. No. 10,594,553.

(60) Provisional application No. 62/437,451, filed on Dec. 21, 2016.

(51) Int. Cl.
| | |
|---|---|
| *H04L 41/0816* | (2022.01) |
| *H04L 41/08* | (2022.01) |
| *H04L 51/18* | (2022.01) |
| *H04L 41/0896* | (2022.01) |
| *H04L 67/00* | (2022.01) |

(52) U.S. Cl.
CPC ...... *H04L 41/0816* (2013.01); *H04L 41/0876* (2013.01); *H04L 41/0896* (2013.01); *H04L 51/18* (2013.01); *H04L 67/34* (2013.01)

(58) Field of Classification Search
CPC ..... H04L 41/08; H04L 51/18; H04L 41/0816; G06F 9/30083
See application file for complete search history.

(56) References Cited

U.S. PATENT DOCUMENTS

| | | | |
|---|---|---|---|
| 6,134,673 | A | 10/2000 | Chrabaszcz |
| 6,609,213 | B1 | 8/2003 | Nguyen et al. |
| 6,785,678 | B2 | 8/2004 | Price |
| 6,854,069 | B2 | 2/2005 | Kampe et al. |
| 6,990,547 | B2 | 1/2006 | Ulrich et al. |

(Continued)

*Primary Examiner* — Nicholas P Celani
(74) *Attorney, Agent, or Firm* — Armstrong Teasdale LLP

(57) ABSTRACT

A method for dynamically provisioning computer components using a message platform communicatively coupled to a message generator is provided. The method includes receiving a first computer message, wherein the first computer message indicates that a computer component should be provisioned for a network cluster, routing the first computer message such that a first platform that is a customer of the first queue i) receives the first computer message and ii) automatically performs a first configuration operation on the computer component based on the first computer message, receiving, at the advanced message queue exchange, a second computer message from the first platform, and routing the second computer message such that a second platform that is a customer of the second queue i) receives the second computer message and ii) automatically performs a second configuration operation on the computer component based on the second computer message.

20 Claims, 11 Drawing Sheets

(56) References Cited

U.S. PATENT DOCUMENTS

| | | | |
|---|---|---|---|
| 7,193,844 B2 | 3/2007 | Garnett et al. | |
| 7,523,286 B2 | 4/2009 | Ramany et al. | |
| 7,661,014 B2 | 2/2010 | Davies et al. | |
| 7,953,703 B2 | 5/2011 | Aggarwal et al. | |
| 8,301,643 B2 | 10/2012 | Aggarwal et al. | |
| 8,311,991 B2 | 11/2012 | Aggarwal et al. | |
| 8,650,566 B2 | 2/2014 | Vaghani et al. | |
| 8,843,925 B1 | 9/2014 | Beda, III et al. | |
| 9,158,734 B1 | 10/2015 | Prabhakara et al. | |
| 9,411,697 B2 | 8/2016 | Aggarwal et al. | |
| 10,594,553 B2* | 3/2020 | Marsh | H04L 41/0896 |
| 2003/0182464 A1* | 9/2003 | Hamilton | G06F 9/546 |
| | | | 719/314 |
| 2006/0136490 A1 | 6/2006 | Aggarwal et al. | |
| 2010/0293544 A1* | 11/2010 | Wilson | G06F 9/45558 |
| | | | 718/1 |
| 2012/0297069 A1 | 11/2012 | Duchastel et al. | |
| 2014/0039683 A1* | 2/2014 | Zimmermann | G06F 1/3206 |
| | | | 700/275 |
| 2014/0115579 A1 | 4/2014 | Kong | |
| 2015/0113106 A1* | 4/2015 | Consul | H04L 29/12113 |
| | | | 709/221 |
| 2015/0264122 A1 | 9/2015 | Shau et al. | |
| 2016/0013992 A1* | 1/2016 | Reddy | G06F 8/61 |
| | | | 709/224 |
| 2016/0306721 A1 | 10/2016 | Aggarwal et al. | |

* cited by examiner

- Type: Add Host (General)
  - Metadata

| Key | Acceptable Values(s) |
|---|---|
| Routing_Key | Translator |
| Cluster_Name | Cluster names |
| Center_Name | Center name/fqdn |
| Environment | Environment (Test, Dev, MTF, etc) |
| Current_Cluster_Members | Array of cluster member names |
| Action | Add |
| SubAction | N/A |

FIG. 6

- Type: Decommission Host (General)
  - Metadata

| Key | Acceptable Values(s) |
|---|---|
| Routing_Key | Translator |
| Cluster_Name | Cluster name |
| Center_Name | Center name/fqdn |
| Action | Decom |
| SubAction | N/A |

FIG. 7

- Type: Add Hardware
  - Metadata

| Key | Acceptable Values(s) |
|---|---|
| Routing_Key | Hardware |
| Environment | Environment (Test, Dev, MTF, etc) |
| CPU_Req | CPU Requirements (Cores/Proc type) |
| Mem_Req | Memory Requirements (in GB) |
| Server_Pool | (optional) specific server pool from which to choose new blade |
| Center_Name | Center name/fqdn |
| Cluster_Name | Cluster names |
| Action | Add |
| SubAction | N/A |

FIG. 8

- Type: Add Virtualization
  - Metadata

| Key | Acceptable Values(s) |
|---|---|
| Routing_Key | Virtualization |
| Environment | Environment (Test, Dev, MTF, etc) |
| MAC_Address | Hardware NIC Address |
| Center_Name | Center Name/fqdn |
| Cluster_Name | Cluster name |
| Blade_Identifier | Blade DN |
| Action | Add |
| SubAction | N/A |

FIG. 9

- Type: Power Action
  - Metadata

| Key | Acceptable Values(s) |
|---|---|
| Routing_Key | Hardware |
| Blade_Identifier | Blade DN |
| Action | PowerOn/PowerOff |
| SubAction | N/A |

FIG. 10 ← 1000

- Type: Decommission Blade (Virtualization)
  - Metadata

| Key | Acceptable Values(s) |
|---|---|
| Routing_Key | Virtualization |
| Center_Name | Center Name/fqdn |
| Cluster_Name | Cluster name |
| Host_name | (Optional) Host Server Identifier |
| Action | Decommission |
| SubAction | (Optional) Flag for hardware issue |

FIG. 11 ← 1100

- Type: Decommission Blade (Hardware)
  - Metadata

| Key | Acceptable Values(s) |
|---|---|
| Routing_Key | Hardware |
| Blade_Identifier | Blade DN |
| MAC_Address | Hardware NIC Address |
| Action | Decom |
| SubAction | (Optional) Flag for hardware issue |

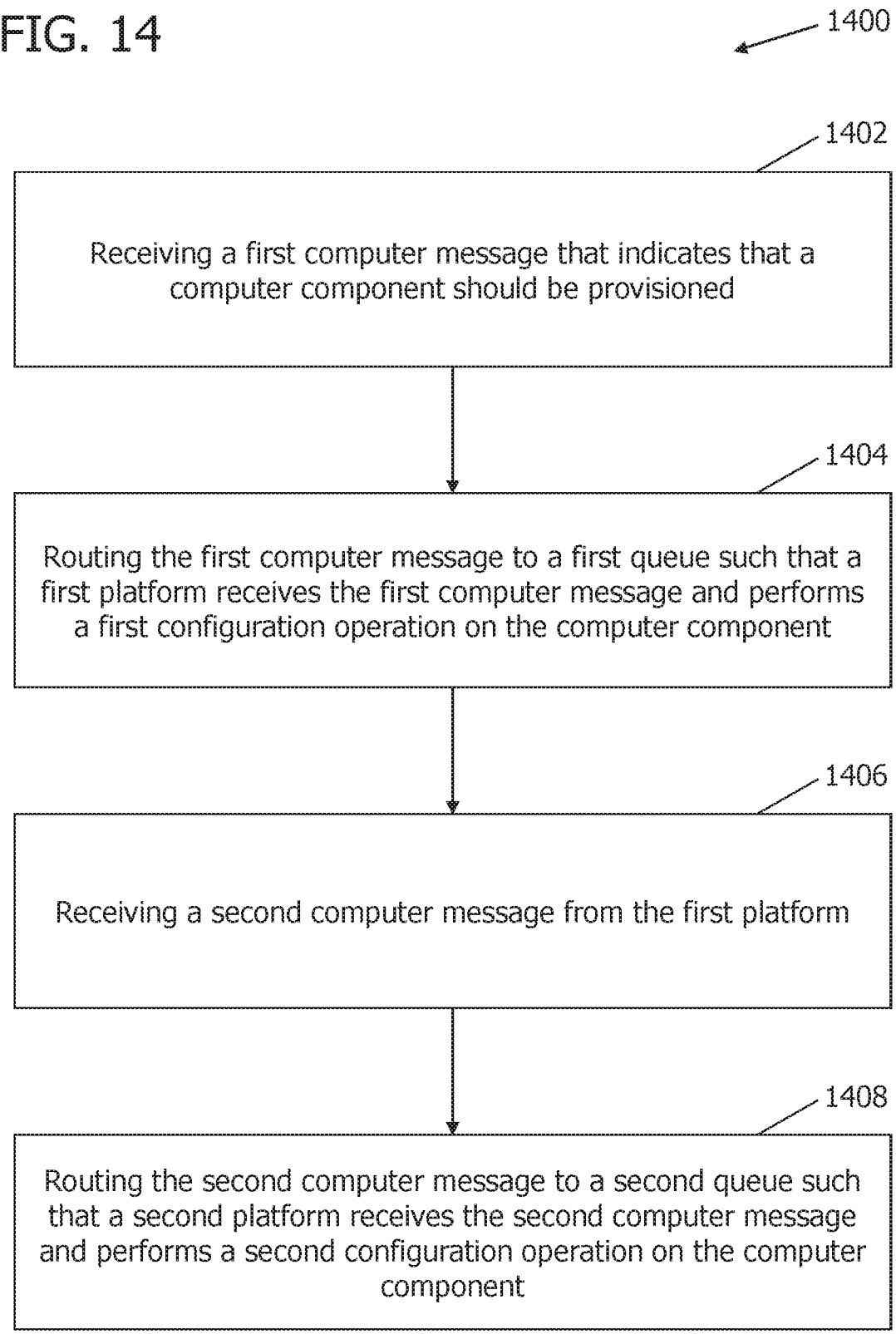

SYSTEMS AND METHODS FOR DYNAMICALLY COMMISSIONING AND DECOMMISSIONING COMPUTER COMPONENTS

CROSS REFERENCE TO RELATED APPLICATIONS

This application is a continuation application of U.S. patent application Ser. No. 15/397,839, filed Jan. 4, 2017, which claims the priority of U.S. Provisional Patent Application Ser. No. 62/437,451, filed Dec. 21, 2016, which are both hereby incorporated by reference in their entirety.

BACKGROUND

This disclosure relates to automatically and dynamically commissioning and decommissioning computer components. More specifically, the disclosure relates to commissioning and decommissioning computer components using a message queue to facilitate communications between virtualization platforms and hardware platforms.

Networked computing environments frequently employ a large number of computer components, such as blade servers. Such computer components perform a myriad of complex tasks using large amounts of data in networked configurations with multiple other computer components. For such computer components, a relatively static infrastructure may be implemented, in which installation of operating systems and/or hypervisors may be automated, but physical hardware is typically installed and not subsequently modified.

To achieve performance advantages and flexibility, it would be desirable to implement an elastic infrastructure for computer components, in which physical hardware, operating systems, and/or hypervisors can be automatically and selectively provisioned to meet dynamic system needs (e.g., workload). To address software needs, tools such as preboot execution environment (PXE) booting and virtualization platforms (e.g., VMware® platforms (VMware is a registered trademark of VMware, Inc., Palo Alto, Calif.)) may be leveraged to automatically provision an operating system. For hardware needs, hardware platforms (e.g., Cisco UCS® platforms (Cisco UCS is a registered trademark of Cisco Technology, Inc., San Jose, Calif.)) allow for hardware to be defined by software, allowing for the automation of physical hardware.

However, facilitating direct communication between virtualization platforms and hardware platforms is relatively difficult. Notably, such architectures require manual interaction by a user, and require that each platform know how to directly contact the other platforms. Further, such architectures are also susceptible to upgrade problems. For example, if one platform is upgraded, existing application programming interfaces (APIs) may change, breaking communication capabilities between the platforms. Additionally, process changes may disrupt how individual technologies are leveraged, requiring a complete rework of communication schemes, which is time-consuming and expensive.

Accordingly, there is a need for more effective systems for dynamically provisioning computer components in a networked computer environment.

BRIEF DESCRIPTION

In one embodiment, a method for dynamically provisioning computer components using a message platform communicatively coupled to a message generator is provided. The method includes receiving, at an advanced message queue exchange of the message platform, a first computer message from the message generator, wherein the first computer message indicates that a computer component should be provisioned for a network cluster, routing the first computer message to a first queue of the message platform such that a first platform that is a customer of the first queue i) receives the first computer message and ii) automatically performs a first configuration operation on the computer component based on the first computer message, receiving, at the advanced message queue exchange, a second computer message from the first platform, and routing the second computer message to a second queue of the message platform such that a second platform that is a customer of the second queue i) receives the second computer message and ii) automatically performs a second configuration operation on the computer component based on the second computer message.

In another embodiment, a system for dynamically provisioning computer components is provided. The system includes a message platform communicatively coupled to a message generator, the message platform configured to receive, at an advanced message queue exchange of the message platform, a first computer message from the message generator, wherein the first computer message indicates that a computer component should be provisioned for a network cluster, route the first computer message to a first queue of the message platform such that a first platform that is a customer of the first queue i) receives the first computer message and ii) automatically performs a first configuration operation on the computer component based on the first computer message, receive, at the advanced message queue exchange, a second computer message from the first platform, and route the second computer message to a second queue of the message platform such that a second platform that is a customer of the second queue i) receives the second computer message and ii) automatically performs a second configuration operation on the computer component based on the second computer message.

In yet another embodiment, a non-transitory computer readable medium that includes computer executable instructions for dynamically provisioning computer components is provided. When executed by a message platform including a processor, the computer executable instructions cause the message platform to receive, at an advanced message queue exchange of the message platform, a first computer message from the message generator, wherein the first computer message indicates that a computer component should be provisioned for a network cluster, route the first computer message to a first queue of the message platform such that a first platform that is a customer of the first queue i) receives the first computer message and ii) automatically performs a first configuration operation on the computer component based on the first computer message, receive, at the advanced message queue exchange, a second computer message from the first platform, and route the second computer message to a second queue of the message platform such that a second platform that is a customer of the second queue i) receives the second computer message and ii) automatically performs a second configuration operation on the computer component based on the second computer message.

BRIEF DESCRIPTION OF THE DRAWINGS

FIGS. 1-14 show example embodiments of the methods and systems described herein.

FIG. 1 shows an example message platform for dynamically provisioning computer components.

FIG. 2 shows an example computer device that may be used with the message platform shown in FIG. 1.

FIG. 3 shows an example server system that may be used with the message platform shown in FIG. 1.

FIG. 4 shows an example processes flow for adding a computer component to a network cluster.

FIG. 5 shows an example processes flow for removing a computer component from a network cluster.

FIGS. 6-12 show example computer messages that may be received and routed by the message platform shown in FIG. 1.

FIG. 13 shows an example system for identifying and removing a faulty computer component that may be used with the message platform shown in FIG. 1.

FIG. 14 shows an example method for provisioning a computer component that may be implemented using the message platform shown in FIG. 1.

Like numbers in the Figures indicate the same or functionally similar components.

DETAILED DESCRIPTION

Figure 1:
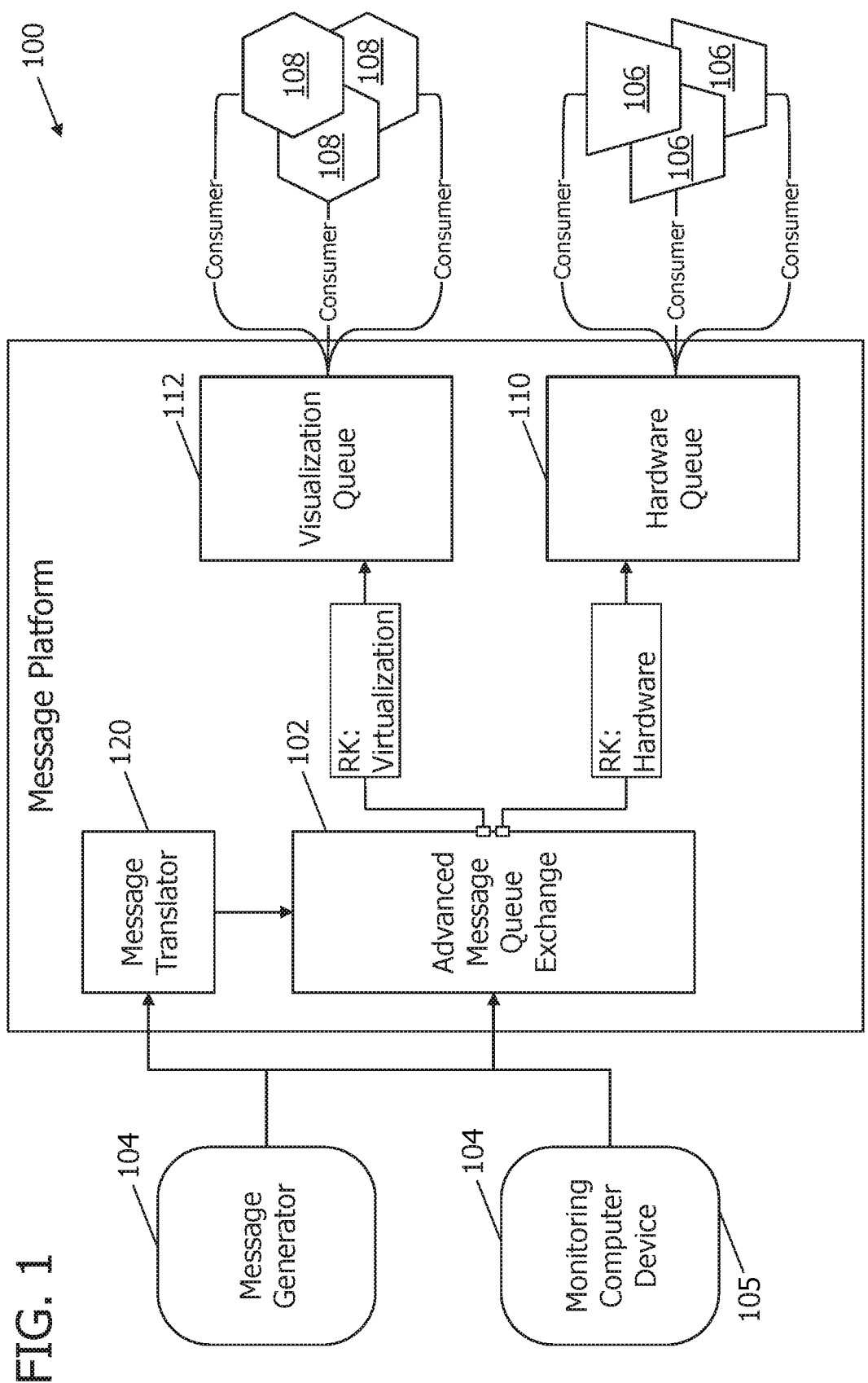

The present disclosure relates to systems and methods for automatically and dynamically commissioning and decommissioning computer components in a network cluster (e.g., to address capacity issues and/or fault issues). To provide an elastic infrastructure, a message platform interfaces between message generators and hardware and virtualization platforms capable of commissioning and decommissioning computer components. The message platform includes an advanced message queue exchange, a hardware queue, and a virtualization queue. The workflow between these devices is automated, and the message platform may be scaled to add additional queues.

In the example embodiment, a message platform facilitates dynamically provisioning computer components for one or more network clusters, as described in detail herein. The message platform includes an advanced message queue exchange that receives and routes computer messages between a plurality of computer systems. Specifically, the advanced message queue exchange is capable of receiving and routing arbitrarily formatted computer messages including textual data between senders and consumers (or receivers) without the senders and consumers being directly aware of each other. Further, the advanced messages queue exchange is blind to specific API calls that may change from version to version, and is also easily scalable, as consumers and queues (described in detail below) may be added and removed as needed.

In the example embodiment, the advanced message queue exchange receives and routes computer messages between at least one message generator, at least one hardware platform, and at least one virtualization platform. The message generator is an example of a sender. The hardware platform and the virtualization platform are examples of consumers, and facilitate commissioning and decommissioning computer components as needed, as described herein. The advanced message queue exchange is capable of receiving computer messages from any suitable device. For example, the message generator may include a monitoring computer device, a hardware platform, a virtualization platform, a workflow, another message queue, etc. Further, the advanced message queue exchange is readily upgradable (e.g., by implementing new APIs and/or modifying workflow engines).

The message platform facilitates provisioning one or more computer components for a network cluster of computer components. As used herein, provisioning a computer component includes commissioning (e.g., adding) a computer component or decommissioning (e.g., removing) a computer component. In the example embodiment, the computer components being commissioned are blade servers. Alternatively, the computer components may be any computer components capable of being provisioned using the message platform.

In the example embodiment, commissioning a blade server includes installing a service profile on the blade server using the hardware platform and installing a host profile on the blade server using the virtualization platform. Further, decommissioning a blade server includes removing the host profile from the blade server using the virtualization platform and removing the service profile from the blade server using the hardware platform.

The service profile may be, for example, a Cisco UCS hardware profile installed on the blade server. The service profile may include, for example, a network configuration for the blade server, component definition data, identity data, firmware revision data, connectivity definition data, IP addresses for other devices in communication with the blade server, a MAC address for the blade server, hardware information for the blade server, etc. Component definition may include, in the case of a hardware component, data regarding the hardware component model, compatible components, performance data, and the like. Identity data includes specific identifiers for the component such as universally unique identifier(s) (UUID), media access control (MAC) address, world-wide name (WWN) data, and the like. Firmware revision data includes data regarding the current firmware version for the component, revision schedules, and the like. Connectivity definition data is usable to configure network adapters, interconnecting components, and the like. The host profile may be, for example, hardware configuration details necessary for a hypervisor to be installed on the blade server.

In the example embodiment, at least one message generator is a monitoring computer device. The monitoring computer device determines whether a computer component needs to be provisioned, and generates and transmits an appropriate computer message to the message platform based on that determination. For example, the monitoring computer device may monitor a current workload and current capacity for a network cluster including at least one computer component. If the current workload is greater than the current capacity of the network cluster (e.g., by a predetermined value), the monitoring computer device determines that an additional computer component should be added to the network cluster, and sends a message to the message platform to add a computer component to the network cluster. In contrast, if the current workload is less than the current capacity (e.g., by a predetermined value), the monitoring computer device determines that a computer component should be removed from the network cluster, and sends a message to the message platform to remove a computer component from the network cluster. In another example, monitoring computer device may be a fault evaluation (FE) platform that detects faults in a computer component in a network cluster, and sends a message to the message platform to remove the faulty computer component from the network cluster.

The message platform includes a hardware queue that forwards computer messages from the advanced message queue exchange to the hardware platform, and a virtualization queue that forwards computer messages from the advanced message queue exchange to the virtualization platform. Specifically, computer messages including a "hardware" routing key are routed to the hardware queue, and computer messages including a "virtualization" routing key are routed to the virtualization queue. Accordingly, the advanced message queue exchange identifies the routing key (if present) in a computer message received from the message generator, and routes the computer message to the appropriate queue based on the routing key included therein.

In the example embodiment, the message platform includes a message translator. Incoming messages from the message generator may not adhere to a uniform format. Accordingly, if needed, the message translator manipulates incoming messages to adjust key-value pairs to acceptable values for the message platform. If incoming messages have a "hardware" or "visualization" routing key, the message translator may be bypassed, as such messages do not require adjustment.

In an example method for commissioning a computer component, the monitoring computer device determines that a computer component (e.g., blade server) should be added to a network cluster (e.g., by monitoring current workload and current capacity of the network cluster). Accordingly, the monitoring computer device sends a first computer message to the hardware platform via the advanced message queue exchange and the hardware queue. The hardware platform receives the first computer message, installs a service profile on the blade server, and sends a second computer message to the virtualization platform via the advanced message queue exchange and the virtualization queue. The virtualization platform receives the second computer message and installs a host profile on the blade server.

In an example method for decommissioning a computer component, the monitoring computer device determines that a computer component (e.g., a blade server) should be removed from a network cluster (e.g., by monitoring current workload and current capacity of the network cluster, or by identifying a faulty blade server). Accordingly, the monitoring computer device sends a first computer message to the virtualization platform via the advanced message queue exchange and the virtualization queue. The virtualization platform receives the first computer message, removes the host profile from the blade server, and sends a second computer message to the hardware platform via the advanced message queue exchange and the hardware queue. The hardware platform receives the second computer message and removes the service profile from the blade server.

The technical problems addressed by this system include at least one of: (i) lack of communication between hardware and virtualization platforms, (ii) inability of addressing capacity issues in a network cluster, (iii) inability of addressing fault issues in a network cluster, and (iv) relying on time-consuming and expensive manual processes for commissioning and decommissioning computer components.

The resulting technical benefits achieved by this system include at least one of: (i) providing communications between hardware and virtualization platforms, (ii) dynamically addressing capacity issues in a network cluster, (iii) dynamically addressing fault issues in a network cluster, and (iv) automatically commissioning and decommissioning computer components to reduce downtime.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable storage medium. In an example embodiment, the system is executed on a single computer system, without requiring a connection to a server computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

The following detailed description illustrates embodiments of the disclosure by way of example and not by way of limitation. It is contemplated that the disclosure has general application in industrial, commercial, and academic applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

FIG. 1 illustrates operation of an example embodiment of a message platform 100. Message platform 100 facilitates dynamically provisioning computer components for one or more network clusters, as described in detail herein. As shown in FIG. 1, message platform 100 includes an advanced message queue exchange 102. Advanced message queue exchange 102 receives and routes computer messages between a plurality of computer systems. Specifically, advanced message queue exchange 102 is capable of receiving and routing arbitrarily formatted computer messages including textual data. The computer messages may be routed between senders and consumers (or receivers) without the senders and consumers being directly aware of each other. Further, advanced messages queue exchange 102 is blind to specific API calls that may change from version to version. Advanced message queue exchange 102 is also easily scalable, as consumers and queues (described in detail below) may be added and removed as needed.

In the example embodiment, advanced message queue exchange 102 receives and routes computer messages between at least one message generator 104, at least one hardware platform 106, and at least one virtualization platform 108. Message generator 104 is an example of a sender. Hardware platform 106 and virtualization platform 108 are examples of consumers, and facilitate commissioning and decommissioning computer components as needed, as described herein. Advanced message queue exchange 102 is capable of receiving computer messages from any suitable device. For example, message generator 104 may include a monitoring computer device, a hardware platform, a virtualization platform, a workflow, another message queue, etc. Further, advanced message queue exchange 102 is readily upgradable (e.g., by implementing new APIs and/or modifying workflow engines).

Message platform 100 facilitates provisioning one or more computer components for a network cluster of computer components. As used herein, provisioning a computer component includes commissioning (e.g., adding) a computer component or decommissioning (e.g., removing) a computer component. In the example embodiment, the computer components being commissioned are blade servers. Alternatively, the computer components may be any computer components capable of being provisioned using message platform 100.

In the example embodiment, commissioning a blade server includes installing a service profile on the blade server using hardware platform 106 and installing a host profile on the blade server using virtualization platform 108. Further, decommissioning a blade server includes removing the host profile from the blade server using virtualization platform 108 and removing the service profile from the blade server using hardware platform 106.

The service profile may be, for example, a Cisco UCS hardware profile installed on the blade server. The service profile may include, for example, a network configuration for the blade server, component definition data, identity data, firmware revision data, connectivity definition data, IP addresses for other devices in communication with the blade server, a MAC address for the blade server, hardware information for the blade server, etc. Component definition may include, in the case of a hardware component, data regarding the hardware component model, compatible components, performance data, and the like. Identity data includes specific identifiers for the component such as universally unique identifier(s) (UUID), media access control (MAC) address, world-wide name (WWN) data, and the like. Firmware revision data includes data regarding the current firmware version for the component, revision schedules, and the like. Connectivity definition data is usable to configure network adapters, interconnecting components, and the like. The host profile may be, for example, hardware configuration details necessary for a hypervisor to be installed on the blade server. For example, VMware might require four network adapters, whereas a Linux OS might require one. The host profile contains this configuration detail and can be applied to any blade server to have the blade server match that configuration (e.g., four network interface controllers versus one, two WWNs versus four).

In the example embodiment, at least one message generator 104 is a monitoring computer device 105. Monitoring computer device 105 determines whether a computer component needs to be provisioned, and generates and transmits an appropriate computer message to message platform 100 based on that determination. For example, monitoring computer device 105 may monitor a current workload and current capacity for a network cluster including at least one computer component. If the current workload is greater than the current capacity of the network cluster (e.g., by a predetermined value), monitoring computer device 105 determines that an additional computer component should be added to the network cluster, and sends a message to message platform 100 to add a computer component to the network cluster. In contrast, if the current workload is less than the current capacity (e.g., by a predetermined value), monitoring computer device 105 determines that a computer component should be removed from the network cluster, and sends a message to message platform 100 to remove a computer component from the network cluster. In another example, monitoring computer device may be a fault evaluation (FE) platform that detects faults in a computer component in a network cluster, and sends a message to message platform 100 to remove the faulty computer component from the network cluster.

Message platform 100 includes a hardware queue 110 that forwards computer messages from advanced message queue exchange 102 to hardware platform 106, and a virtualization queue 112 that forwards computer messages from advanced message queue exchange 102 to virtualization platform 108. Specifically, computer messages including a "hardware" routing key are routed to hardware queue 110, and computer messages including a "virtualization" routing key are routed to virtualization queue 112. Accordingly, advanced message queue exchange 102 identifies the routing key (if present) in a computer message received from message generator 104, and routes the computer message to the appropriate queue based on the routing key included therein.

As shown in FIG. 1, in the example embodiment, message platform 100 includes a message translator 120. Incoming messages from message generator 104 may not adhere to a uniform format. Accordingly, if needed, message translator 120 manipulates incoming messages to adjust key-value pairs to acceptable values for message platform 100. If incoming messages have a "hardware" or "visualization" routing key, message translator 120 may be bypassed, as such messages do not require adjustment.

Figure 2:
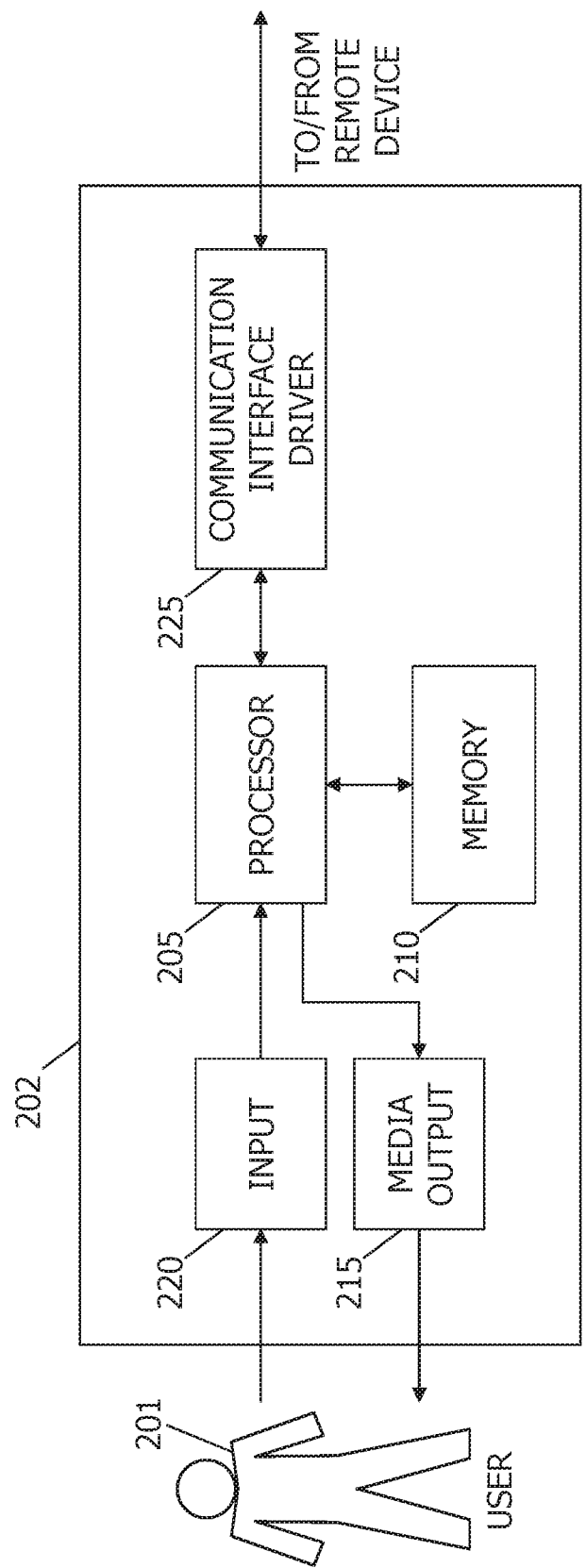

FIG. 2 illustrates an example configuration of a computer device 202 that interoperates with message platform 100 to facilitate functions of message platform 100. Computer device 202 may be, for example, monitoring computer device 105 that generates and sends messages to message platform 100 in order to provision computer components, as described herein. In the example embodiment, computer device 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

Computer device 202 also includes at least one media output component 215 for presenting information to user 201. Media output component 215 is any component capable of conveying information to user 201. For example, media output component 215 may be a display component configured to display application data to user 201. In some embodiments, media output component 215 includes an output adapter such as a video adapter and/or an audio adapter. An output adapter is operatively coupled to processor 205 and operatively connectable to an output device such as a display device, a liquid crystal display (LCD), organic light emitting diode (OLED) display, or "electronic ink" display, or an audio output device, a speaker or headphones.

In some embodiments, computer device 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. Computer device 202 may also include a communication interface driver 225, which is communicatively connectable to a remote device. Communication interface driver 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX). Stored in memory area 210 are, for example, computer readable instructions for providing a user interface to user 201 via media output component 215 and, optionally, receiving and processing input from input device 220. A user interface may include, among other possibilities, a web browser and computer application.

Figure 3:
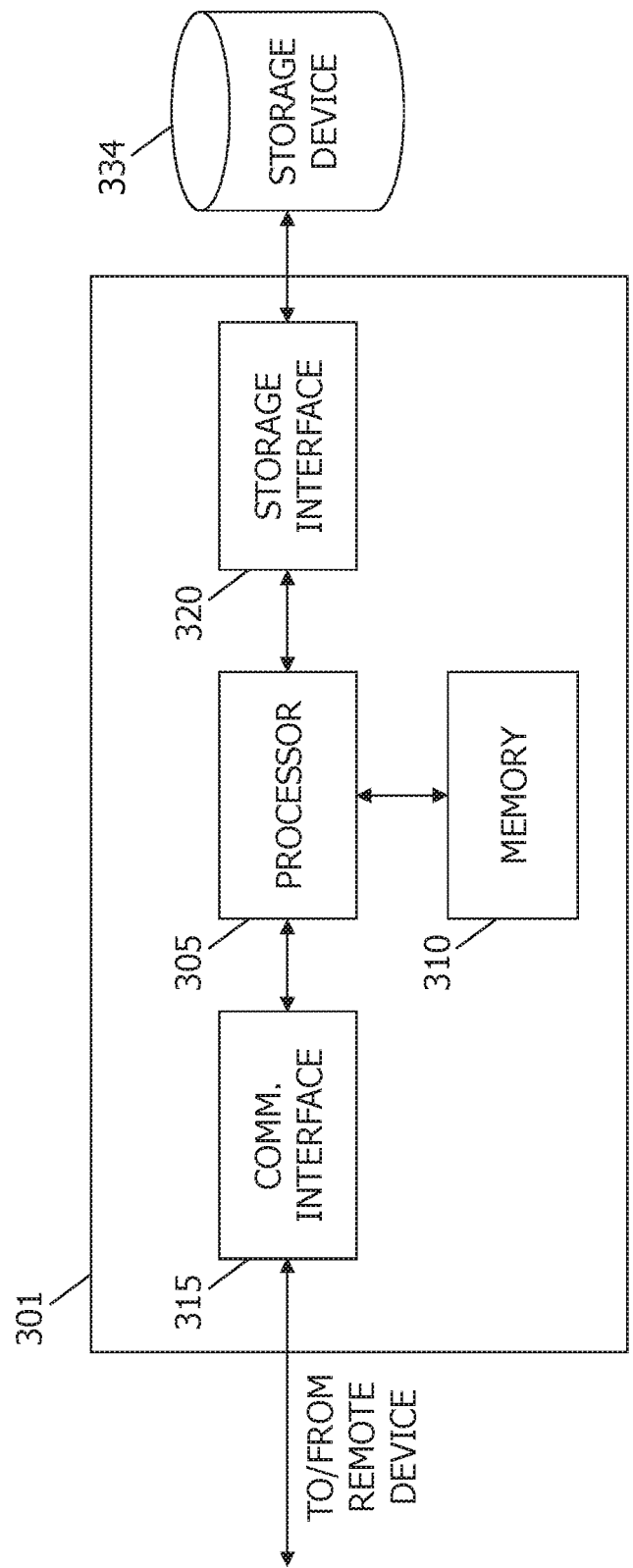

FIG. 3 illustrates an example configuration of a server system 301 such as message platform 100 (shown in FIG. 1). Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. More specifically, the instructions may cause various data manipulations on data stored in a storage device 334 (e.g., create, read, update, and delete procedures). It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.). Processor 305 is operatively coupled to a communication interface 315 such that server system 301 is capable of communicating with a remote device such as a computer device or another server system 301.

Processor 305 may be operatively coupled to storage device 334. Storage device 334 is any computer-operated hardware suitable for storing and/or retrieving data. In some embodiments, storage device 334 is integrated in server system 301. In other embodiments, storage device 334 is external to server system 301. For example, server system 301 may include one or more hard disk drives as storage device 334. In other embodiments, storage device 334 is external to server system 301 and may be accessed by a plurality of server systems 301. For example, storage device 334 may include multiple storage units such as hard disks or solid state disks in a redundant array of inexpensive disks (RAID) configuration. Storage device 334 may include a storage area network (SAN) and/or a network attached storage (NAS) system.

In some embodiments, processor 305 is operatively coupled to storage device 334 via a storage interface 320. Storage interface 320 is any component capable of providing processor 305 with access to storage device 334. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 334.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 4:
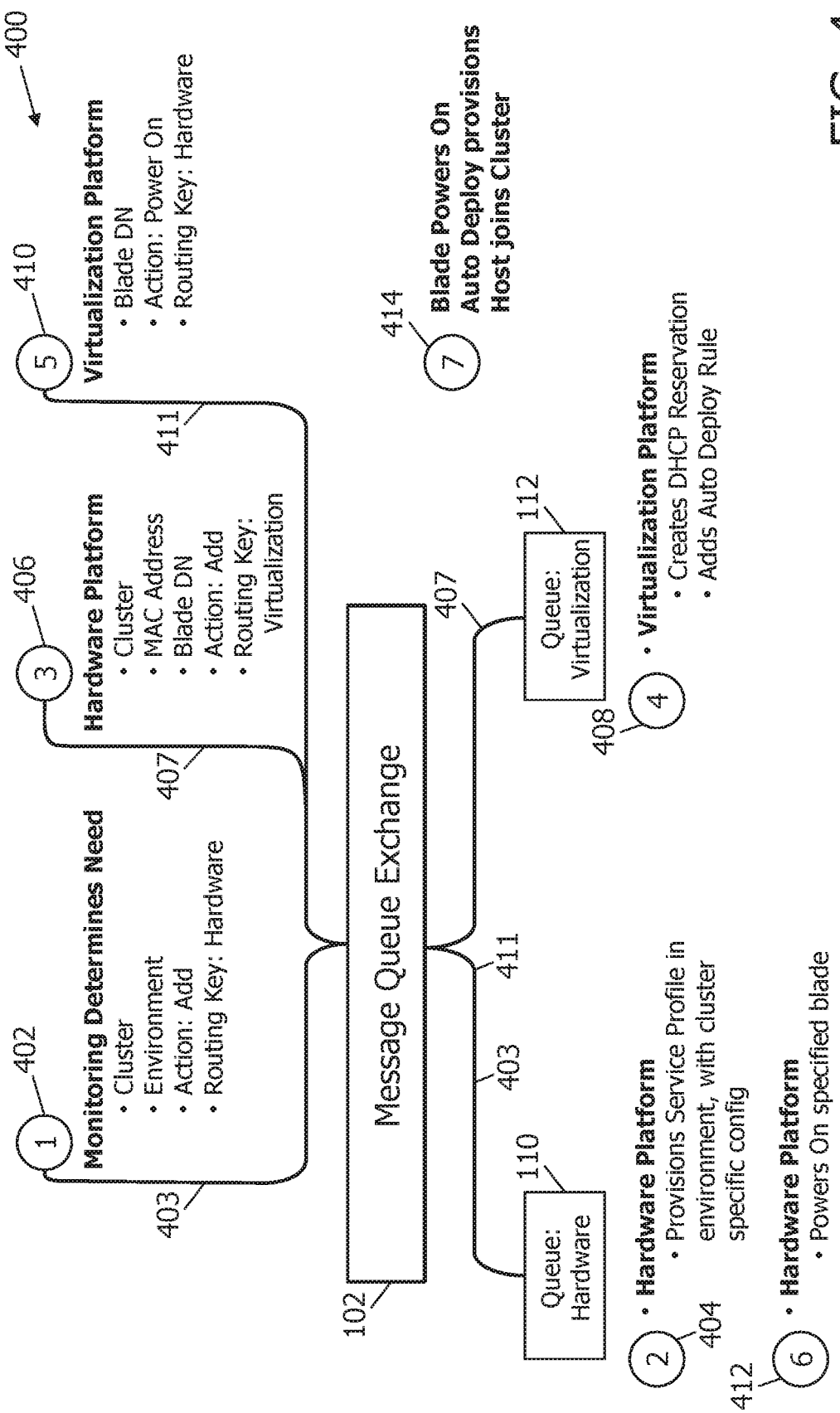

FIG. 4 illustrates an example process flow 400 for adding a computer component (e.g., a blade server) to network cluster. At a first step 402, monitoring computer device 105 determines that a computer component should be added to a network cluster (e.g., by monitoring current workload and current capacity of the network cluster). Accordingly, monitoring computer device 105 sends a first computer message 403 to advanced message queue exchange 102. In this embodiment, first computer message 403 specifies the cluster to which the blade server should be added, specifies the environment for the blade server, includes "Add" in an action field (to indicate that a blade server should be added), and includes "Hardware" as the routing key (to cause advanced message queue exchange 102 to route first computer message 403 to hardware queue 110). Alternatively, first computer message 403 may include any metadata that enables flow 400 to function as described herein.

At a second step 404, hardware platform 106 receives first computer message 403 via hardware queue 110. In response, hardware platform 106 installs a service profile on the blade server to be added, based on the cluster and environment information included in the computer message.

At a third step 406, hardware platform 106 sends a second computer message 407 to advanced message queue exchange 102. In this embodiment, second computer message 407 specifies the cluster to which the blade server should be added, specifies the MAC address and distinguished name (DN) for the blade server, includes "Add" in an action field (to indicate that the blade server should be added), and includes "Virtualization" as the routing key (to cause advanced message queue exchange 102 to route second computer message 407 to virtualization queue 112). Alternatively, second computer message 407 may include any metadata that enables flow 400 to function as described herein.

At a fourth step 408, virtualization platform 108 receives second computer message 407 via virtualization queue 112. In response, virtualization platform 108 installs a host profile on the blade server. Specifically, in this embodiment, virtualization platform 108 creates a dynamic host configuration protocol (DHCP) reservation for the blade server, installs a virtualization host on the blade server, and adds an auto deploy rule to the blade server. In the example embodiment, fourth step 408 leverages DHCP, and creates rules that will determine what version of virtualization software will be installed upon the blade server based on certain criteria (e.g., blade model, hardware address, etc.).

At a fifth step 410, virtualization platform 108 sends a third computer message 411 to advanced message queue exchange 102. In this embodiment, third computer message 411 specifies the DN for the blade server, includes "Power On" in an action field (to indicate that the blade server should be powered on), and includes "Hardware" as the routing key (to cause advanced message queue exchange 102 to route third computer message 411 to hardware queue 110). Alternatively, third computer message 411 may include any metadata that enables flow 400 to function as described herein.

At a sixth step 412, hardware platform 106 receives third computer message 411 via hardware queue 110. In response, hardware platform 106 powers on the blade server (e.g., by performing a PXE boot). Once the blade server is powered on, the blade server receives DHCP data, and performs a preboot execution environment (PXE) boot based on the DHCP data. The PXE boot process will identify which rules were created and apply those rules to install the virtualization software (following the auto deploy rule). Once the virtualization software is installed, the host profile is applied, which includes configuring the virtualization software by configuring network names, cluster membership, etc. Accordingly, after the blade server is powered on, at a seventh step 414, the auto deploy rule causes the blade server to join the network cluster. After the blade server joins the network cluster, load-balancing is performed to re-distribute the workload across all of the blade servers in the network cluster.

Figure 5:
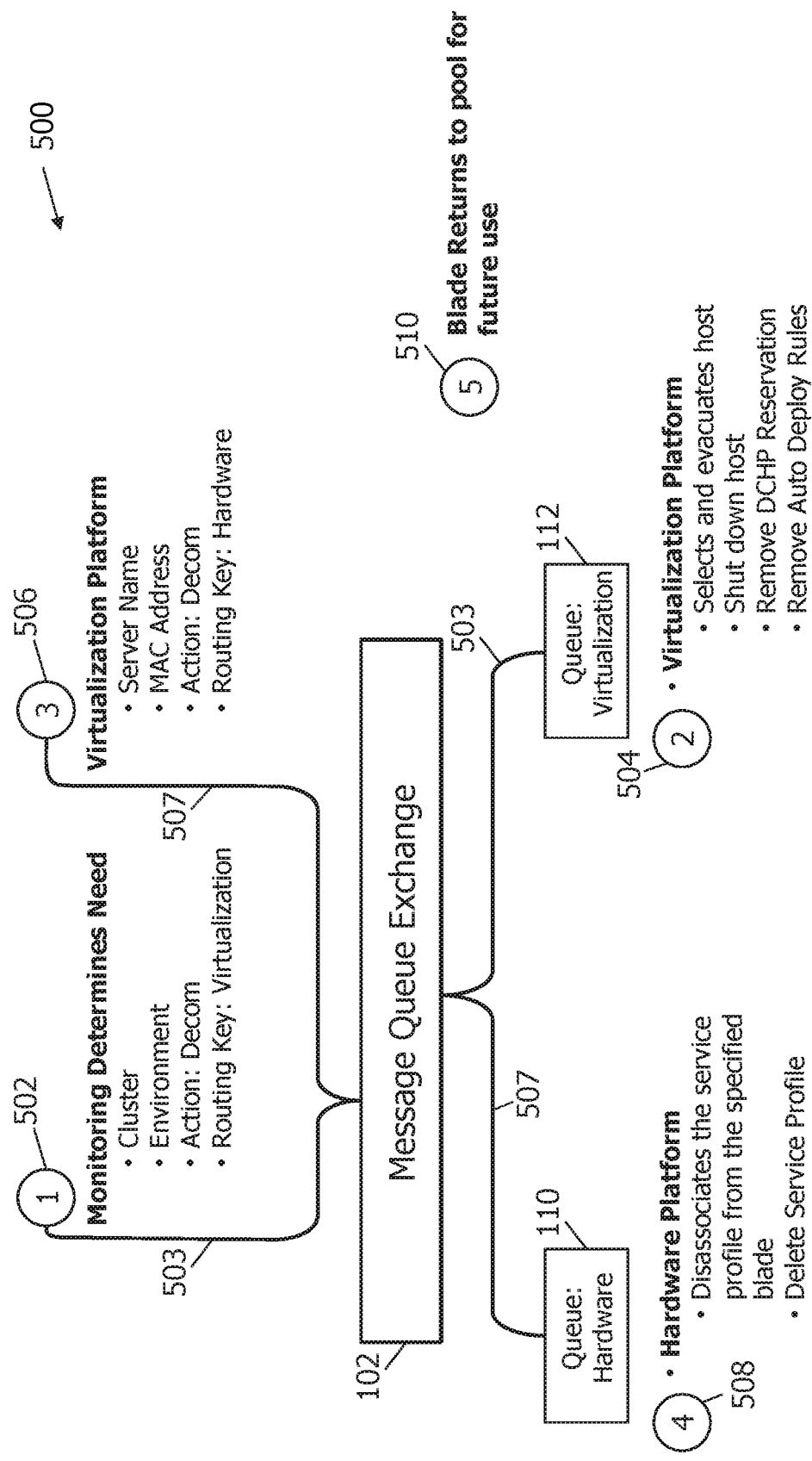

FIG. 5 illustrates an example process flow 500 for removing a computer component (e.g., a blade server) from a network cluster. At a first step 502, monitoring computer device 105 determines that a computer component should be removed from a network cluster (e.g., by monitoring current workload and current capacity of the network cluster, or by identifying a faulty blade server). Accordingly, monitoring computer device 105 sends a first computer message 503 to advanced message queue exchange 102. In this embodiment, first computer message 503 specifies the cluster from which the blade server should be removed, specifies the environment for the blade server, includes "Decom" in an action field (to indicate that a blade server should be removed/decommissioned), and includes "Virtualization" as the routing key (to cause advanced message queue exchange 102 to route first computer message 503 to virtualization queue 112). Alternatively, first computer message 503 may include any metadata that enables flow 500 to function as described herein.

At a second step 504, virtualization platform 108 receives first computer message 503 via virtualization queue 112. In response, virtualization platform 108 selects and evacuates the host profile from the blade server, shuts down the blade server, and removes the DHCP reservation and auto deploy rules from the blade server.

At a third step 506, virtualization platform 108 sends a second computer message 507 to advanced message queue exchange 102. In this embodiment, second computer message 507 specifies the server name for the blade server, specifies the MAC address for the blade server, includes "Decom" in an action field (to indicate that the blade server should be removed/decommissioned), and includes "Hardware" as the routing key (to cause advanced message queue exchange 102 to route second computer message 507 to hardware queue 110). Alternatively, second computer message 507 may include any metadata that enables flow 500 to function as described herein.

At a fourth step 508, hardware platform 106 receives second computer message 507 via hardware queue 110. In response, hardware platform 106 removes the service profile from the blade server and deletes the service profile. With the service profile removed, at a fifth step 510, the blade server returns to pool of available blade servers for future provisioning. The workload of the decommissioned blade server is distributed across the remaining blade servers in the network cluster.

FIGS. 6-12 illustrate example computer messages and metadata included therein that may be received and routed by message platform 100. For example, FIG. 6 illustrates a general add host message 600 for adding a computer component from a network cluster. Message 600 includes the routing key "Translator", which causes message 600 to be received and manipulated as needed by message translator 120 (shown in FIG. 1). Message 600 includes a cluster name, center name, environment, and cluster members for the computer component to be added. Message 600 further includes "Add" in the action field (to indicate that the computer component should be added).

FIG. 7 illustrates a general remove host message 700 for removing a computer component from a network cluster. Message 700 includes the routing key "Translator", which causes message 700 to be received and manipulated as needed by message translator 120 (shown in FIG. 1). Message 700 includes a cluster name and center name for the computer component to be removed. Message 700 further includes "Decom" in the action field (to indicate that the computer component should be removed). The information provided in the fields of message 600 and message 700 is used to intelligently determine (by the receiving system) which blade server should be acted upon FIG. 8 illustrates an add hardware message 800 for adding a computer component to a network cluster. Message 800 may be, for example, first computer message 403 (shown in FIG. 4). Message 800 includes the routing key "Hardware", which causes message 800 to be routed to hardware queue 110 (shown in FIG. 1). Message 800 includes an environment, CPU requirement, memory requirement, center name, and cluster name for the computer component to be added. Message 800 may also specify a server pool from which the added computer component is to be selected. Message 800 further includes "Add" in the action field (to indicate that the computer component should be added).

FIG. 9 illustrates an add virtualization message 900 for adding a computer component to a network cluster. Message 900 may be, for example, second computer message 407 (shown in FIG. 4). Message 900 includes the routing key "Virtualization", which causes message 900 to be routed to virtualization queue 112 (shown in FIG. 1). Message 900 includes an environment, MAC address, center name, cluster name, and blade identifier for the computer component to be added. Message 900 further includes "Add" in the action field (to indicate that the computer component should be added).

FIG. 10 illustrates a power action message 1000 for powering on a computer component to be added or powering off a computer component to be removed. Message 1000 may be, for example, third computer message 411 (shown in FIG. 4). Message 1000 includes the routing key "Hardware", which causes message 1000 to be routed to hardware queue 110 (shown in FIG. 1). Message 1000 includes a blade identifier and either "PowerOn" (to power the identified blade server on) or "PowerOff" (to power the identified blade server off) in the action field.

FIG. 11 illustrates a remove virtualization message 1100 for removing a computer component from a network cluster. Message 1100 may be, for example, first computer message 503 (shown in FIG. 5). Message 1100 includes the routing key "Virtualization", which causes message 1100 to be routed to virtualization queue 112 (shown in FIG. 1). Message 1100 includes a center name and cluster name for the computer component to be removed. Message 1100 may also include a host server identifier and/or a hardware issue flag in a sub-action field. For example, if the computer component is being removed due to hardware issues (e.g., not due to workload/capacity levels), message 1100 causes the removed computer component to be flagged so that it is not designated as a computer component available to be later added to a network cluster. The flag may be added to the computer component, for example, by hardware platform 106 or virtualization platform 108. Message 1100 further includes "Decom" in the action field (to indicate that the computer component should be removed).

Figure 12:
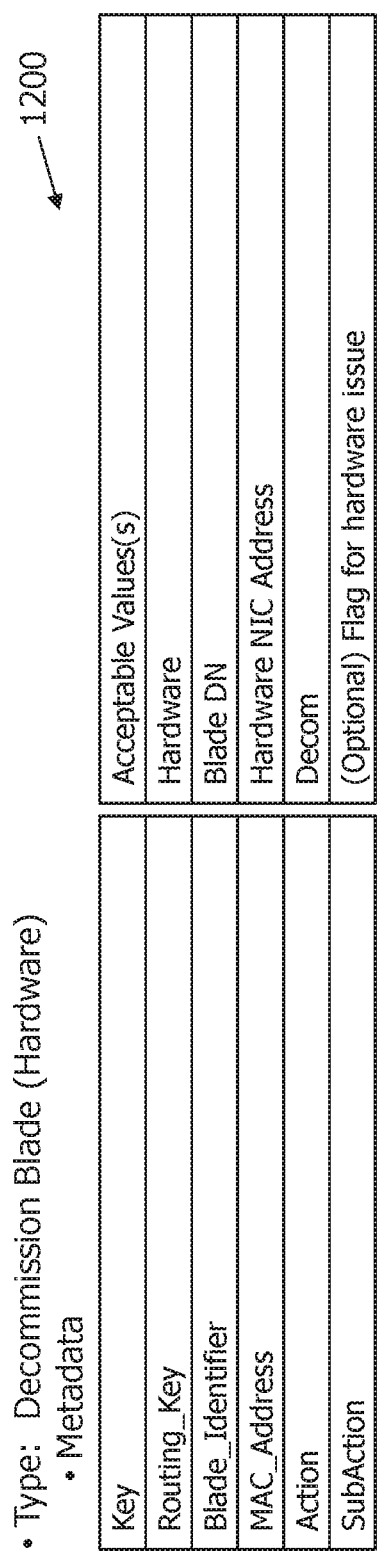

FIG. 12 illustrates a remove hardware message 1200 for removing a computer component from a network cluster. Message 1200 may be, for example, second computer message 507 (shown in FIG. 5). Message 1200 includes the routing key "Hardware", which causes message 1200 to be routed to hardware queue 110 (shown in FIG. 1). Message 1200 includes a blade identifier and MAC address for the computer component to be removed. Message 1200 may also include a hardware issue flag in the sub-action field. For example, if the computer component is being removed due to hardware issues (e.g., not due to workload/capacity levels), message 1200 causes the removed computer component to be flagged so that it is not designated as a computer component available to be later added to a network cluster. The flag may be added to the computer component, for example, by hardware platform 106 or virtualization platform 108. Message 1200 further includes "Decom" in the action field (to indicate that the computer component should be removed).

Figure 13:
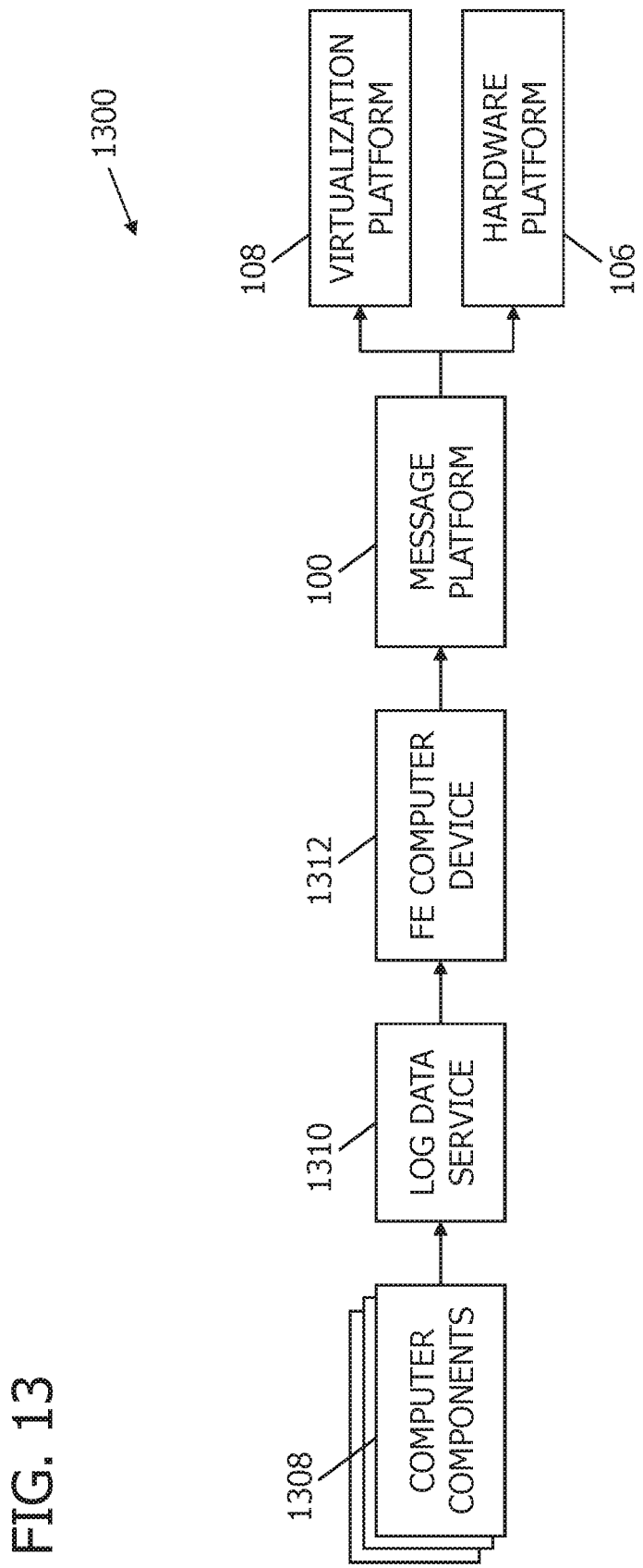

As described above, in some embodiments, a computer component is removed from a network cluster because that computer component is determined to be faulty. FIG. 13 illustrates an example system 1300 for identifying and removing a faulty computer component. As shown in FIG. 13, a plurality of computer components 1308 are connected to a log data service 1310. Log data service 1310 is communicatively coupled to a fault evaluation (FE) platform 1312. FE platform 1312 is further communicatively coupled to message platform 100.

In one embodiment, computer components 1308 generate log data. Log data is collected and aggregated by log data service 1310. Log data service provides the log data to FE platform 1312. FE platform 1312 receives log data and generates fault scores for each fault event for each component in components 1308.

FE platform 1312 is also configured to compare the generated fault score for a fault event against a threshold. In one embodiment, a user of FE platform 1312 defines the fault score threshold for FE platform 1312 to use. The threshold may vary based on the specific time of observation, the type of component, component usage, or any other factor bearing on fault evaluation for the component. When a fault score exceeds the predefined threshold, FE platform 1312 is configured to identify the component from components 1308 that encountered the fault event whose score exceeded the threshold. FE platform 1312, functioning as message generator 104 (shown in FIG. 1), generates and transmits a computer message to message platform 100 to cause the identified faulty component to be removed. Message platform 100 interfaces with hardware and virtualization platforms 106 and 108, as described above, to remove and flag the faulty computer component. The decommissioned computer component is then investigated offline for the source of the fault in order to perform repairs.

FIG. 14 is a flow diagram of an example method 1400 for provisioning a computer component that may be implemented using message platform 100 (shown in FIG. 1). Method 1400 includes receiving 1402, at an advanced message queue exchange of the message platform, a first computer message from a message generator, wherein the first computer message indicates that a computer component should be provisioned for a network cluster. Method 1400 further includes routing 1404 the first computer message to a first queue of the message platform such that a first platform that is a customer of the first queue i) receives the first computer message and ii) automatically performs a first configuration operation on the computer component based on the first computer message. Method 1400 further includes receiving 1406, at the advanced message queue exchange, a second computer message from the first platform. Method 1400 further includes routing 1408 the second computer message to a second queue of the message platform such that a second platform that is a customer of the second queue i) receives the second computer message and ii) automatically performs a second configuration operation on the computer component based on the second computer message.

As will be appreciated based on the foregoing specification, the above-described embodiments of the disclosure may be implemented using computer programming or engineering techniques including computer software, firmware, hardware or any combination or subset thereof, wherein the technical effect is to establish and operate a filesystem-based application network. Any such resulting program, having computer-readable code means, may be embodied or provided within one or more computer-readable media, thereby making a computer program product, (i.e., an article of manufacture), according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method for dynamically provisioning computer components using a message platform communicatively coupled to a message generator, the method comprising:
   receiving, at an advanced message queue exchange of the message platform, a first computer message from the message generator indicating that a computer component should be commissioned, wherein the advanced message queue exchange is operable to receive and route computer messages between a plurality of computer systems;
   routing the first computer message to a hardware queue of the message platform such that a hardware platform that is a customer of the hardware queue i) receives the first computer message and ii) automatically installs a service profile on the computer component in response to receiving the first computer message;
   receiving, at the advanced message queue exchange, a second computer message from the hardware platform, the second computer message generated at the hardware platform and including a distinguished name (DN) of the computer component that the hardware platform installed the service profile on;
   routing the second computer message including the DN to a virtualization queue of the message platform such that a virtualization platform that is a customer of the virtualization queue i) receives the second computer message, ii) creates rules based on hardware criteria of the computer component, iii) applies the rules to the second computer message to determine a version of a host profile to be installed on the computer component based on the hardware criteria of the computer component and hardware configuration details necessary for a hypervisor to be installed on the computer component, and iv) automatically installs the version of the host profile on the computer component in response to determining the version of the host profile;
   receiving, at the advanced message queue exchange, a third computer message from the virtualization platform, the third computer message generated at the virtualization platform, wherein the third computer message generated at the virtualization platform is a power action message including multiple associated data fields, the multiple associated data fields including i) an identification field including the DN of the computer component, ii) an action field including an indication that the computer component corresponding to the DN in the identification field should be powered on, and iii) a routing key field including a routing key associated with the hardware queue of the message platform, wherein the virtualization platform populates the identification field of the power action message using the DN included in the second computer message that was routed from the hardware platform to the virtualization platform;
   identifying, at the advanced message queue exchange, the routing key from the third computer message; and
   routing, based on the routing key, the third computer message to the hardware queue of the message platform such that the hardware platform receives the third computer message, wherein the hardware platform identifies the computer component based on the DN included in the identification field of the third computer message, and wherein the hardware platform automatically powers on the computer component based on the indication included in the action field of the third computer message.

2. A method in accordance with claim 1, wherein the computer component is a blade server.

3. A method in accordance with claim 1, further comprising generating the first computer message at the message generator based on a comparison of a current workload to a current capacity of a network cluster.

4. A method in accordance with claim 1, further comprising generating the first computer message at the message generator based on detection of a faulty computer component.

5. A method in accordance with claim 1, wherein the service profile includes a network configuration for the computer component, component definition data for the computer component, and a MAC address for the computer component.

6. A method in accordance with claim 1, wherein the host profile includes the hardware configuration details necessary for the hypervisor to be installed on the computer component.

7. A method in accordance with claim 1, wherein the second computer message generated at the hardware platform specifies a MAC address and the DN of the computer component.

8. A method in accordance with claim 1, wherein the second computer message generated at the hardware platform causes the virtualization platform to:
   create a dynamic host configuration protocol for the computer component;
   install a virtualization host on the computer component; and
   add an auto deploy rule to the computer component.

9. A method in accordance with claim 8, wherein, once the computer component is automatically powered on by the hardware platform in response to the third computer message generated by the virtualization platform, the computer component:
   receives dynamic host configuration protocol data;
   boots based on the received dynamic host configuration protocol data;
   applies the host profile installed by the virtualization platform; and
   joins a network cluster in accordance with the auto deploy rule added by the virtualization platform.

10. A method in accordance with claim 1, wherein the first computer message includes i) a network cluster to which the computer component should be added, ii) an environment for the computer component, and iii) an action parameter indicating that the computer component should be added.

11. A method in accordance with claim 10, wherein the second computer message includes i) the network cluster, ii) the environment, and iii) the action parameter.

12. A method in accordance with claim 1, wherein the first computer message includes a first routing key associated with the hardware queue of the message platform, and wherein routing the first computer message to the hardware queue comprises routing the first computer message using the first routing key.

13. A system for dynamically provisioning computer components, the system comprising:
   a message platform communicatively coupled to a message generator, the message platform comprising a processor in communication with a memory area, the message platform configured to:

receive, at an advanced message queue exchange of the message platform, a first computer message from the message generator indicating that a computer component should be decommissioned, wherein the advanced message queue exchange is operable to receive and route computer messages between a plurality of computer systems, and wherein the first computer message is a power action message including multiple associated data fields, the multiple associated data fields including i) an identification field including a distinguished name (DN) of the computer component, ii) an action field including an indication that the computer component corresponding to the DN in the identification field should be powered off, and iii) a routing key field including a routing key associated with a virtualization queue of the message platform;

identify, at the advanced message queue exchange, the routing key from the first computer message; and route, based on the routing key, the first computer message to a virtualization queue of the message platform such that a virtualization platform that is a customer of the virtualization queue i) receives the first computer message, ii) creates rules based on hardware criteria of the computer component, iii) applies the rules to the first computer message to determine a version of a host profile to be removed from the computer component based on the hardware criteria of the computer component and hardware configuration details necessary for a hypervisor to be removed from the computer component, and iv) automatically removes the version of the host profile from the computer component in response to determining the version of the host profile, wherein the first computer message causes the virtualization platform to:

identify the computer component based on the DN included in the identification field of the first computer message;

select and evacuate the host profile from the computer component;

automatically shut down the computer component based on the indication included in the action field of the first computer message; and generate a second computer message, wherein the second computer message includes a further identification field including the DN, the virtualization platform populating the further identification field using the DN included in the power action message that was routed from the message generator to the virtualization platform;

receive, at the advanced message queue exchange, the second computer message from the virtualization platform; and route the second computer message including the DN to a hardware queue of the message platform such that a hardware platform that is a customer of the second queue i) receives the second computer message and ii) automatically removes a service profile from the computer component in response to receiving the second computer message generated at the virtualization platform.

14. A system in accordance with claim 13, wherein the computer component is a blade server.

15. A system in accordance with claim 13, wherein the first computer message further causes the virtualization platform to remove a dynamic host configuration protocol reservation and auto deploy rules from the computer component.

16. A system in accordance with claim 13, wherein the first computer message includes i) a network cluster from which the computer component should be removed, ii) an environment for the computer component, and iii) an action parameter indicating that the computer component should be removed.

17. A system in accordance with claim 16, wherein the second computer message includes i) the network cluster, ii) the environment, and iii) the action parameter.

18. A non-transitory computer readable medium that includes computer executable instructions for dynamically provisioning computer components, wherein when executed by a message platform comprising a processor, the computer executable instructions cause the message platform to:

receive, at an advanced message queue exchange of the message platform, a first computer message from a message generator indicating that a computer component should be commissioned, wherein the advanced message queue exchange is operable to receive and route computer messages between a plurality of computer systems;

route the first computer message to a hardware queue of the message platform such that a hardware platform that is a customer of the hardware queue i) receives the first computer message and ii) automatically installs a service profile on the computer component in response to receiving the first computer message;

receive, at the advanced message queue exchange, a second computer message from the hardware platform, the second computer message generated at the hardware platform and including a distinguished name (DN) of the computer component that the hardware platform installed the service profile;

route the second computer message including the DN to a virtualization queue of the message platform such that a virtualization platform that is a customer of the virtualization queue i) receives the second computer message, ii) creates rules based on hardware criteria of the computer component, iii) applies the rules to the second computer message to determine a version of a host profile to be installed on the computer component based on the hardware criteria of the computer component and hardware configuration details necessary for a hypervisor to be installed on the computer component, and iv) automatically installs the version of the host profile on the computer component in response to determining the version of the host profile;

receive, at the advanced message queue exchange, a third computer message from the virtualization platform, the third computer message generated at the virtualization platform, wherein the third computer message generated at the virtualization platform is a power action message including multiple associated data fields, the multiple associated data fields including i) an identification field including the DN of the computer component, ii) an action field including an indication that the computer component corresponding to the DN in the identification field should be powered on, and iii) a routing key field including a routing key associated with the hardware queue of the message platform, wherein the virtualization platform populates the identification field of the power action message using the DN included in the second computer message that was routed from the hardware platform to the virtualization platform;

identifying, at the advanced message queue exchange, the routing key from the third computer message; and route, based on the routing key, the third computer message to the hardware queue of the message platform such that the hardware platform receives the third computer message, wherein the hardware platform identifies the computer component based on the DN included in the identification field of the third computer message, and wherein the hardware platform automatically powers on the computer component based on the indication included in the action field of the third computer message.

19. A non-transitory computer readable medium in accordance with claim 18, wherein the computer component is a blade server.

20. A non-transitory computer readable medium in accordance with claim 18, wherein the first computer message includes i) a network cluster to which the computer component should be added, ii) an environment for the computer component, iii) an action parameter indicating that the computer component should be added.

* * * * *